United States Patent
Chen et al.

(10) Patent No.: US 7,139,576 B2
(45) Date of Patent: Nov. 21, 2006

(54) PRIMARY CELL IDENTIFICATION METHOD UNDER SITE SELECTIVE DIVERSITY TRANSMIT

(75) Inventors: Yuehua Chen, Shen Zhen (CN); Zhibin Zheng, Shen Zhen (CN); Shuling Liu, Shen Zhen (CN)

(73) Assignee: Huawei Technologies Co., Ltd., Shen Zhen (CN)

( * ) Notice: Subject to any disclaimer, the term of this patent is extended or adjusted under 35 U.S.C. 154(b) by 18 days.

(21) Appl. No.: 10/734,982

(22) Filed: Dec. 12, 2003

(65) Prior Publication Data

US 2004/0127219 A1    Jul. 1, 2004

Related U.S. Application Data

(63) Continuation of application No. PCT/CN02/00088, filed on Feb. 10, 2002.

(30) Foreign Application Priority Data

Jul. 18, 2001  (CN) ................................ 01 1 26232

(51) Int. Cl.
*H04Q 7/20*    (2006.01)
(52) U.S. Cl. ...................... 455/438; 455/525; 455/439
(58) Field of Classification Search ................ 455/525, 455/439, 442, 422, 552.1, 522, 524, 438, 455/553.1; 370/335
See application file for complete search history.

(56) References Cited

U.S. PATENT DOCUMENTS 6,167,285 A * 12/2000  Howe ....................... 455/552.1
6,285,874 B1 * 9/2001  Magnusson et al. ...... 455/456.1
6,690,939 B1 * 2/2004  Jonsson et al. .............. 455/453
6,799,045 B1 * 9/2004  Brouwer ...................... 455/453
6,862,275 B1 * 3/2005  Dabak ......................... 370/342
2001/0008523 A1 * 7/2001  Song ........................... 370/335

FOREIGN PATENT DOCUMENTS

WO    WO 95/14343    5/1995

* cited by examiner

*Primary Examiner*—Matthew D. Anderson
*Assistant Examiner*—Tan Trinh
(74) *Attorney, Agent, or Firm*—Dorsey & Whitney LLP

(57) ABSTRACT

A method for identifying the primary cell under Site Selective Diversity Transmit comprises the steps of: (1) An ID is assigned by the system to each cell; (2) The ID indicating the primary cell is transmitted periodically by UE to the connected cells via the up link FBI fields; (3) The ID indicating the primary cell transmitted by the mobile station is received by the base station, if the signals received by the base station satisfy with one of the following conditions, then the said base station will consider itself as a primary cell; the identification conditions are: A. The ID code word indicating the primary cell received by the base station is matched with the ID code word of itself; B. The quality of the up link signals received does not satisfy with a quality threshold Qth, at the same time, there is a certain matching degree between the received ID code word indicating the primary cell and the ID code word of the cell itself; and C. The bits of dropping of the ID code word caused by using the up link compression mode excess a limitation. The signals transmitted form some of the non-primary cells having extremely bad quality to UE can be prevented, thereby the system interference is reduced, and the system stability and the system capacity are increased.

3 Claims, 2 Drawing Sheets

PRIMARY CELL IDENTIFICATION METHOD UNDER SITE SELECTIVE DIVERSITY TRANSMIT

CROSS-REFERENCE TO RELATED APPLICATION

This application is a continuation of International Patent Application No. PCT/CN02/00088, filed on Feb. 10, 2001, which claims priority to Chinese Application No. 01 126 232.x, filed on Jul. 18, 2001. The contents of both applications are incorporated herein by reference.

FIELD OF THE INVENTION

The invention relates to a field of the mobile communication application technology, more particularly, relates to a method for primary cell identification under Site Selective Diversity Transmit applying WCDMA mobile communication system using SSDT technology.

BACKGROUND OF THE INVENTION

SSDT (Site Selective Diversity Transmit) is one of the important technologies used in the advanced mobile communication systems, and a correct identification of the primary cell is an important step affecting the performance of SSDT technology.

Site Selective Diversity Transmit (SSDT) is a macro diversity method under the soft handoff. The operation procedure is as follows: a cell is selected by UE (user equipment) as a primary cell from an active set, and the other cells are non-primary cells. The main object is to perform down link transmit from the primary cell, and thereby, to suppress the interference produced by the multi-transmit in the soft handoff mode. The second object is to obtain fast site selection when the network does not take part in, thereby, to ensure the advantages of the soft handoff. In order to select a primary cell, a temporary identifier (ID) is assigned to each of the cells, and the ID of the primary cell is transmitted periodically by UE to the connected cells via the up link FBI (feedback indication) fields, and the cells selected by UE as non-primary cells will stop to transmit. The activation of SSDT, the end of SSDT, and the assignment of the IDs are performed via the high layer signaling.

An ideal cell identification situation supporting SSDT technology is indicated in FIG. 1. Wherein, the cell where base station 1 is located in is a real primary cell selected by UE. Base station 3 and base station 4 are non-primary cells located in the active set of UE. In FIG. 1, base station 1 is identified by itself as a primary cell, therefore, the down link user data are transmitted to UE; and the other base stations are identified correctly by themselves as non-primary cells, therefore, although the up link signals transmitted by UE are received, however, the down link user data are not transmitted to UE.

The condition for deciding a cell by itself whether it is a primary cell or a non-primary cell is stipulated in Rel'99 V3.7.0 of 3GPP Specification TS25.214, the stipulation is as follows:

The ID code word of the primary cell is transmitted periodically by UE via a part of the up link FBI (S field of FBI) assigned to SSDT. If the following conditions are satisfied with simultaneously, then a non-primary cell will be considered by itself:

A'. The received ID code word of the primary cell and the ID code word of itself are not matched;

B'. The quality of the received up link signals satisfies with a quality threshold Qth, the said threshold is a parameter defined by the network.

C'. The number of the bits of the ID code word drop caused by using the up link compression mode does not excess an upper limit, the said upper limit is (int) $N_{ID}/3$, wherein, $N_{ID}$ is the length of the ID code word.

Otherwise, the cell itself will be considered as a primary cell by the cell.

It is indicated particularly that the conditions A, B, and C stated in the other portions in the patent are conditions for identifying directly the primary cell, and in order to distinguish from the condition for identifying the non-primary cell introduced in Background Art, the symbols A', B', and C' are used herein to indicate the conditions for identifying non-primary cell.

It can be seen, under SSDT mode, the condition for a cell to decide itself being a non-primary cell is critical, and the condition to decide itself being a primary cell is relatively not critical, and the object for doing so is to avoid as much as possible the situation that none of the cells considers itself as a primary cell from occurring. Under SSDT mode of the soft handoff, once there is no primary cell, it will cause directly that no cell transmits the service data to UE, causing the data being lost and the quality of the transmission information being degraded.

It is necessary to explain particularly, wherein, the object of the condition B' is to make that only the cell, which identifies reliably the ID code word of the said cell being not matched with the received ID coed word, considers itself as a non-primary cell. If that the quality of the up link signals is not good enough to ensure the reliability of the result of the match algorithm is discovered by the cells, then the cells will consider themselves as the primary cell under such situation regardless the match result.

It is considered by the prior primary cell identification technology that if the cell conforms with the above three conditions A', B', and C' simultaneously, then the cell will identify itself as a non-primary cell. Wherein, the function of condition B' is to ensure the reliability of a cell deciding itself as a non-primary cell. However, this will cause the following improper situation to occur: If the quality of the up link signals received by a cell does not satisfy with the threshold Qth, that is, when the up link signals are under a bad situation, the said cell will certainly decide itself as a primary cell. In practical, if the difference of the propagation distance between the respective cells and UE is considered as an important affecting factor of the quality difference of the up links and down links between UE and the respective cells in the active set, then the possibility of the said cell being selected by UE as a primary cell will be relatively small.

The above situation corresponds to that under SSDT mode, except the real primary cells in the active set, some cells with rather bad quality are also identified as the primary cells, while some cells in the active set with better signal quality are decided as the non-primary cells. This causes some bad results, because the cells with the quality that is bad to a certain extent (below Qth) will transmit DPDCH (dedicated physical data channel) to UE, and the said signal will interfere significantly the other users. While the DPDCH signal of the said cell provides rather small function to UE, and it is difficult to indicate the benefit of SSDT. On the other hand, under such situation, UE may combine DPDCH signals of the real primary cells and the cells with bad quality, (note: the bad cells may make no contribution to the combination). Corresponding to the situation that UE may combine a plurality of cells in active set under the condition without SSDT, the receiving performance under SSDT will be worse. Therefore, under the above situation, not only does not present the benefit of reducing the interference under SSDT, but also it is even worse than not introducing SSDT.

This situation of the prior primary cell identification technology is explained in FIG. 2. The base station 1 is identified correctly as a primary cell because of not conforming with the condition A'; the base station 2 conforms simultaneously with three conditions A', B', and C' for identifying the non-primary cells, therefore, it identifies correctly itself as the non-primary cell; and the base station 3 and base station 4 do not conform with the condition B, that is, the quality of the up link signals is worse than the threshold Qth, therefore, they decide themselves as the primary cells, and transmits to UE the down link service data. It can be seen, with respect to the base station 3 and base station 4, the signals with better quality may be provided by the base station 2, however, not transmitted; the signals transmitted by the base station 3 and base station 4 produces the additional down link interference.

SUMMARY OF THE INVENTION

The invention aims at and improves the primary cell identification method in SSDT technology submitted in the technical specification TS25.214 of 3GPP (the third generation of partner organization), and a primary cell identification method under the Site Selective Diversity Transmit is suggested, the bad results occurring in the prior technology can be prevented effectively to optimize the primary cell identification condition based on the invention, and the primary cell can be selected by a larger probability, thereby the quality of the services and the continue transmission is ensured.

In order to realize the object of the invention, the technical scheme employed by the invention is: a primary cell identification method under the base station diversity transmission comprising the steps of:

(1) A temporary identifier (ID) is assigned by the system to each cell;

(2) The label ID indicating the primary cell is transmitted periodically by UE of the mobile station to the connected cells via the up link FBI (feedback indication) fields;

(3) The label ID indicating the primary cell transmitted by the mobile station is received by the base station, if the signals received by the base station satisfy with one of the following conditions, then the said base station will consider itself as a primary cell; the identification conditions are:

A. The label ID code word indicating the primary cell received by the base station is matched with the label ID code word of itself;

B. The quality of the up link signals received by the base station does not satisfy with a quality threshold Qth, the said threshold is a parameter defined by the network;

C. The bits of dropping of the identifier code word caused by using the up link compression mode excess a value, the said value is a maximum integer not larger than ⅓ length of the original identifier code word;

It is characterized in that, the said condition B in step (3) shall also comprises: the label ID code word indicating the primary cell received by the base station has a certain matching degree with the ID code word of the cell itself.

A method for identifying the primary cell under the Site Selective Diversity Transmit, wherein, the said matching degree in condition B of step (3) refers to that the matching degree P of the label ID code word indicating the primary cell received by the base station and ID code of the present cell is larger than a certain threshold Plr.

A method for identifying the primary cell under the Site Selective Diversity Transmit, wherein, the said threshold Plr in condition B of step (3) is set by the high layer.

BRIEF DESCRIPTION OF THE DRAWINGS

The specific features and performances of the invention are further described by the following embodiments and the drawings thereof.

DETAILED DESCRIPTION OF THE PREFERRED EMBODIMENTS

Figure 1:
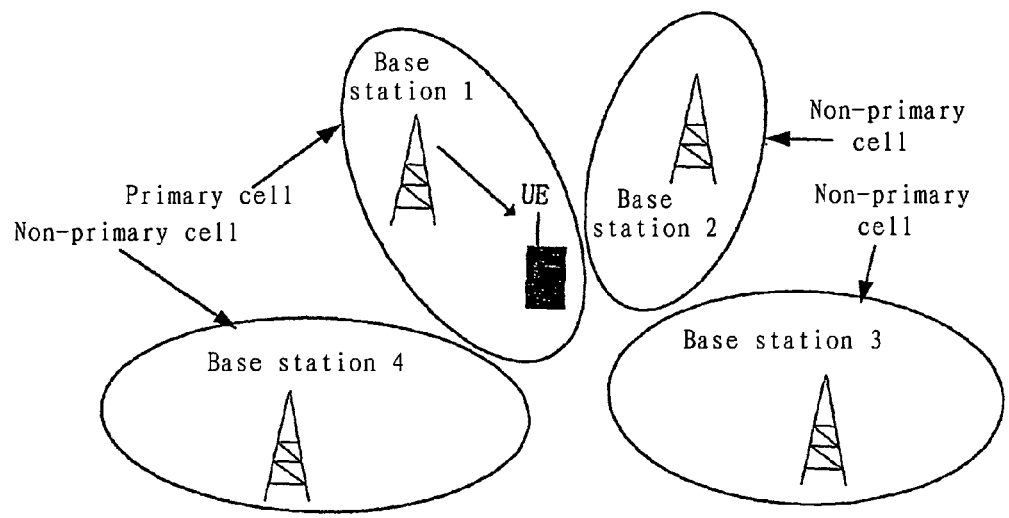
FIG. 1 is an illustration diagram for an ideal primary cell identification situation of SSDT technology supported by the prior art.

It is considered in the invention that one of the reasons for introducing the bad performances in the prior art is that "as long as the quality of the up link signals do not satisfy with a quality threshold Qth, it certainly identifies itself as a primary cell". That is, the above condition B causes the identification range of the primary cell improper. Thus, it is considered in the invention that condition B shall be improved. Condition B is modified to widen the condition for identifying as a non-primary cell, at the same time, the condition for identifying as a primary cell is made to be further strict.

It is considered in the invention based on the above analysis, that the condition of "the quality of the received up link signals does not satisfy with a quality threshold Qth" shall be treated in distinct ways. The standard of the distinction may be a threshold Plr indicating the matching degree of the label ID code word indicating the primary cell received by the base station and the received ID code word. When it is occurred that the quality of the up link signals does not satisfy with the quality threshold Qth, if the matching degree P of the received ID code word and the ID code word of the cell itself is low enough, that is, P<Plr, then the cell will not consider itself as a primary cell, therefore, it will be not necessary to transmit the down link data information to UE; in contrast, if the matching degree P of the received ID code word and the ID code word of the cell itself still has a certain matching degree, that is, P≧Plr, then the cell will consider itself as a primary cell.

A method for identifying the primary cell under Site Selective Diversity Transmit in the invention comprises the steps of:

(1) A temporary identifier (ID) is assigned by the system to each cell;

(2) The label ID indicating the primary cell is transmitted periodically by UE of the mobile station to the connected cells via the up link FBI (feedback indication) fields;

(3) The label ID indicating the primary cell transmitted by the mobile station is received by the base station, if the signals received by the base station satisfy with one of the following conditions, then the said base station will consider itself as a primary cell; the identification conditions are:

A. The received label ID code word indicating the primary cell is matched with the label ID code word of itself;

B. The quality of the up link signals received by the base station does not satisfy with a quality threshold Qth, the said threshold is a parameter defined by the network; at the same time, the label ID code word indicating the primary cell received by the base station and the ID code word of the cell itself have a certain matching degree; the said matching degree refers to that the matching degree P of the label ID code word indicating the primary cell received by the base station and ID code of the present cell is larger than a certain threshold Plr; and the said threshold Plr is set by the high layer.

C. The bits of dropping of the identifier code word caused by using the up link compression mode excess an upper limit, the said upper limit is $(int)N_{ID}/3$, wherein, $N_{ID}$ is the length of the ID code word.

Because the ID code word of the cell is a result which is added the redundancy by encoding, so the said redundant information cam be utilized to retrieve the matching degree P of the ID of the received cell and the ID of the present cell. P is inversely proportional to the distance d between the received ID code word and the ID code word of the present cell. If the matching degree is small, then the probability of indicating that the present cell is a real primary cell will be very small.

Figure 2:
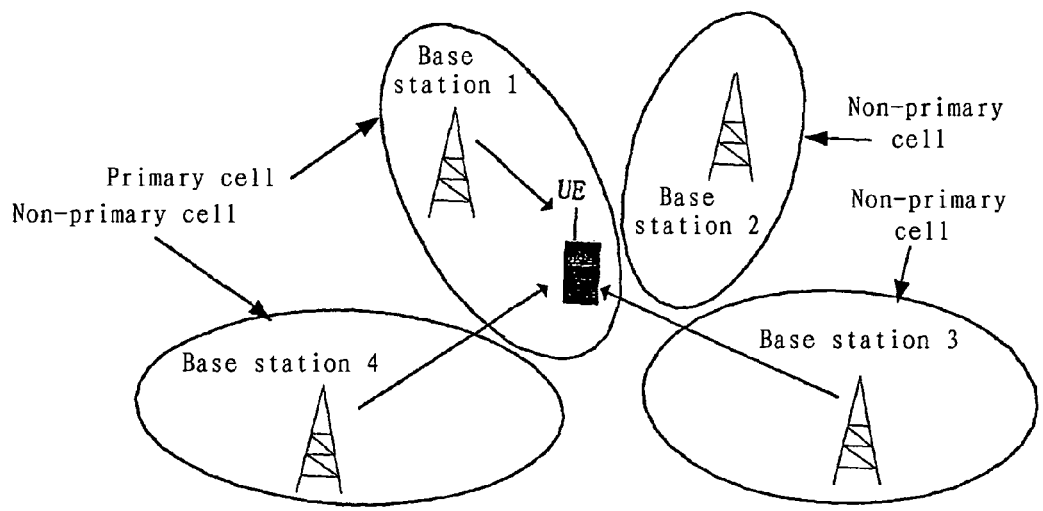
FIG. 2 is an illustration diagram of a situation caused by the primary cell identification conditions of the prior art.
Figure 3:
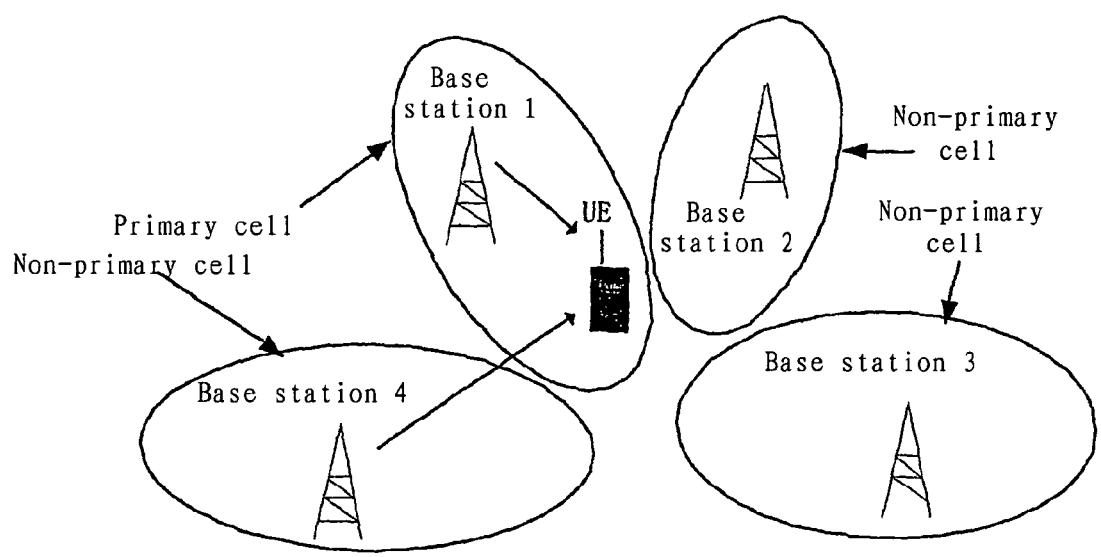
FIG. 3 is an illustration diagram caused by the primary cell identification conditions of the invention.

FIG. 3 indicates the improvement of the prior art made by the invention. The base station 1 is identified correctly as a primary cell because of satisfying with condition A; the base station 2 does not satisfy with three conditions A, B, and C for identifying the primary cell, therefore it identifies correctly itself as a non-primary cell; the base station 3 and base station 4 satisfy with the portion of "the quality of the received up link signals does not satisfy with the quality threshold $Q_{th}$," in condition B, however, by comparing the matching degree, the matching degree P of the base station 3 is P<Plr, then the base station 3 is still decided as a non-primary cell; because the error code in the signal propagation, the matching degree P of the base station 4 is P≧Plr, then the base station 4 is decided as a primary cell. It can be seen by comparing with FIG. 2, the base station 3 is further decided as a non-primary cell, and an additional interference to the down link transmit is reduced.

In addition, it is required to indicate particularly, the matching degree of the ID code can also be used for the decision of "the received ID code word of the primary cell is matched with the self ID code word" in condition A, assuming that the threshold used in condition A is Pa, that is, if P≧Pa, then condition A will be set up, then Pa>Plr will be satisfied with, if the said relationship is not satisfied, then the function of the quality threshold Qth of the received signals will not exist. This situation correspondent to that two thresholds are set for the matching degree value P, each of the thresholds is used for two different conditions A and B.

Comparing the invention with the prior art, the advantages therein are evident:

When the particular treatment of the compression mode is not considered, that is, the above condition C is not considered, then the technology of the invention is not employed, the primary cell is composed of commonly by the sets of (1) a cell, in which the received code word and the ID code of the present cell are highly matched regardless the quality of the received up link signals; and (2) a cell, in which the quality of the received up link signals is lower than the threshold Qth.

However, after employing the invention, the primary cell is composed of commonly by the sets of (1) A cell, in which the received code word and the ID code of the present cell are highly matched regardless the quality of the received up link signals; and (2) A cell, in which the quality of the received up link signals is lower than the threshold Qth, however, it still has a certain matching degree.

Thus, the restriction conditions of the non-primary cell in the prior SSDT technology have been improved by the invention. Under the premise that it does not affect substantially to identify correctly the primary cell, transmitting signals to UE by the non-primary cell with very bad quality is prevented to a large extent, thereby the system interference is reduced and the system stability and system capacity is increased.

The features of the invention will be further discussed as follows by an embodiment based on a situation of FBI domain with 1 bit in FDD system of WCDMA.

1) It is encoded by the system for those having ID codes being assigned by the base station, please refer to the following table for the method thereof, the following table is a method for setting the ID code for 1 bit FBI:

TABLE 1

Setting ID Code of 1 Bit FBI

| ID label | ID code | | |
| --- | --- | --- | --- |
| | "long" | "medium" | "short" |
| a | 000000000000000 | (0)0000000 | 00000 |
| b | 101010101010101 | (0)1010101 | 01001 |
| c | 011001100110011 | (0)0110011 | 11011 |
| d | 110011001100110 | (0)1100110 | 10010 |
| e | 000111100001111 | (0)0001111 | 00111 |
| f | 101101001011010 | (0)1011010 | 01110 |
| g | 011110000111100 | (0)0111100 | 11100 |
| h | 110100101101001 | (0)1101001 | 10101 |

It can be seen from the above table that the cells in 8 active sets correspond respectively to 8 ID labels (labels), each ID label has three types (long, medium, and short) of the code length.

2) The decision method for condition A "the received ID code word of the primary cell is matched with the self ID code word" is stipulated:

The decision method for condition A is stipulated as: the hard decision is performed for all of the received ID code words, it will be considered that condition A has been set up as long as there is a result of the hard decision of less than x bits does not conform with the ID code words of the present cell, and it is taken herein 1, 2, and 4, for the code length of short, medium and long, respectively.

There are several methods for deciding condition A, comprising soft decision, hard decision, threshold setting, and the like, the selection of the specific decision method depends on the implementation.

3) The decision method for condition B "the quality of the received up link signals does not satisfy with a quality threshold Qth, and the said threshold is a parameter defined by the network, at the same time, the matching degree of the received ID code and the ID code of the present cell is not lower than a certain threshold Plr, and the threshold Plr can also be set by the high later" is stipulated.

The measurement method for quality Q of the received up link signals and the threshold thereof are not the key points of the invention, any method conforming with the specification can be selected, and they are not described in detail in the present embodiment.

The calculation of "the matching degree value P of the received ID code and the ID code of the present cell" can be stipulated as: the hard decision is performed for all of the received ID code words, and the value of P is the difference of the number of the corresponding bits taken from the bit sequence of the decision result and the ID code sequence of the present cell.

Plr can be stipulated as: for long code length, Plr=8, for medium code length, Plr=4, and for short code length, Plr=3.

4) It is assumed that the situation of the up link compression does not occurred in the present embodiment, that is, the affect of condition C is not considered for the analysis in step 5).

5) Based on step 1) to step 4), the identification situation of the primary cell and non-primary cell is as follows:

a. If condition A is true, then, the said cell will be identified as a primary cell, and it will proceed to step 5; otherwise, step 2 will be implemented.

b. If (Q>=Qth), then the said cell will be identified as a non-primary cell, and it will proceed to step 5; otherwise, step 3 will be implemented.

c. If (P>Plr), then the said cell will be identified as a non-primary cell, and it will proceed to step 5; otherwise, step 4 will be implemented.

d. The said cell is identified as a primary cell, and step 5 will be implemented.

The identification procedure is ended.

INDUSTRIAL APPLICABILITY

Since the cells having a quality of the up link signals being lower than a threshold are divided, and it is defined that the cell having a certain matching degree between the ID of the present cell and the received ID will decide itself as a primary cell; if the said matching degree is not sufficient, then it will still be decided as the non-primary cell, in this way, in one aspect, the primary cell being identified inevitably as long as the quality of the up link signals being bad enough in the prior art can be prevented, thereby the chance for increasing the additional interference of the down link signals will be reduced significantly; on the other hand, when the quality of the up link signals are not so good, identifying the real primary cells, which still have a certain matching degree, is protected, thereby the continue transmit of the signals will be ensured.

What is claimed is:

1. A method for identifying a primary cell under Site Selective Diversity Transmit, wherein each cell is considered as non-primary cell initially, the method comprising the steps of:

assigning a temporary identifier by a network system to the each cell;

transmitting an identifier indicating the primary cell periodically by a mobile station to connected cells via up link feedback indication fields; and receiving, by a base station, the identifier indicating the primary cell transmitted by the mobile station, if signals received by the base station satisfy with one of conditions, then the base station considers itself as the primary cell, and wherein the conditions are:

(A) an identifier code word indicating the primary cell received by the base station is matched with the identifier code word of itself;

(B) quality of up link signals received by the base station does not satisfy with a quality threshold, wherein the quality threshold is a parameter defined by the network system;

(C) bits of dropping of the identifier code word caused by using an up link compression mode excess a value, wherein the value is a maximum integer not larger than ⅓ length of the identifier code word; and wherein in the condition B), the identifier code word indicating the primary cell received by the base station has a certain matching degree with an ID code word of the cell itself; and wherein the steps of transmitting and receiving are performed periodically and the cell will no longer consider itself as primary cell when the conditions are not satisfied.

2. The method of claim 1, wherein the matching degree in condition B) is a matching degree P of the identifier code word indicating the primary cell received by the base station and the ID code of the cell is larger than a threshold Plr.

3. The method of claim 2, wherein the threshold Plr in condition (B) is set by a higher system layer.

* * * * *